United States Patent Office 3,500,704
Patented Mar. 17, 1970

3,500,704
SUPERIMPOSED TRANSMISSION
Helmut Müller and Wilhelm Gsching, Heidenheim, Germany, assignors to Voith Getriebe KG, Heidenheim (Brenz), Germany
Filed Feb. 16, 1968, Ser. No. 706,022
Claims priority, application Germany, Feb. 25, 1967, 1,625,177
Int. Cl. F16h *47/08*
U.S. Cl. 74—688     5 Claims

ABSTRACT OF THE DISCLOSURE

A compound transmission, especially for use in connection with the drive of feed pumps for boilers, for controlling the speed of such pumps, which includes a direct power path and an indirect power path from the driving means for the compound transmission to the output shaft thereof, said indirect power path being variable as to speed by a variable converter, preferably variable by adjustment of the guide wheel blades thereof, said direct and indirect power paths uniting in a planetary gear transmission forming part of said compound transmission.

---

The present invention concerns a superimposed transmission in the form of a planetary gear transmission, of which the first main member is connected to the driving engine while the second main member is connected to a superimposed machine variable in speed, whereas the third main member is connected to the output shaft. Superimposed transmissions of this type will by means of the superimposed or heterodyne machine permit a control of the output shaft speed within a limited range at which the degree of efficiency of the control drive will, in view of the output deviation not be so important, as is the case with a directly effective control transmission. Superimposed transmissions also are suitable as power transmission in installations which in addition to a full-load range at normal speed of operation, have to have an overload range at a speed in excess thereof as, for instance, with boiler feeding pump drives according to the requirements set forth by law.

The question forming the basis of the present invention is—which heterodyne machine is particularly suitable with regard to control, purchasing costs, wear, life, servicing, and safety of operation. Heretofore suggested drives through electromotors with Ward-Leonard hosists or thyristor controls are expensive or not sufficiently safe in operation. Also, the hydrostatic drives do not meet the requirements to the desired extent because the wear and the servicing costs are relatively high and the safety of operation is not satisfactory, and last, but not least, the limitations in output are very disturbing.

It is, therefore, an object of the present invention to provide a transmission which will overcome the above-mentioned drawbacks.

It is another object of this invention to provide a transmission of the above-mentioned general type which is highly favorable with regard to control, costs, wear, life, servicing, and safety of operation.

Figure 1:
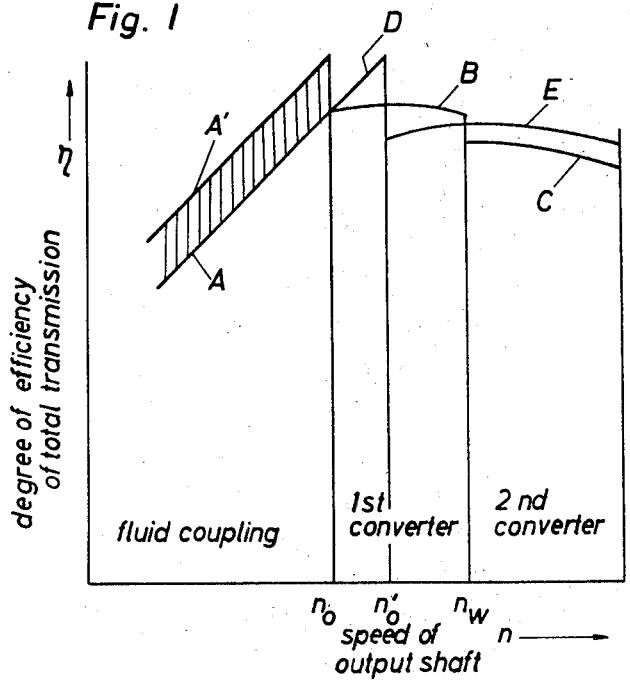
Figure 4:
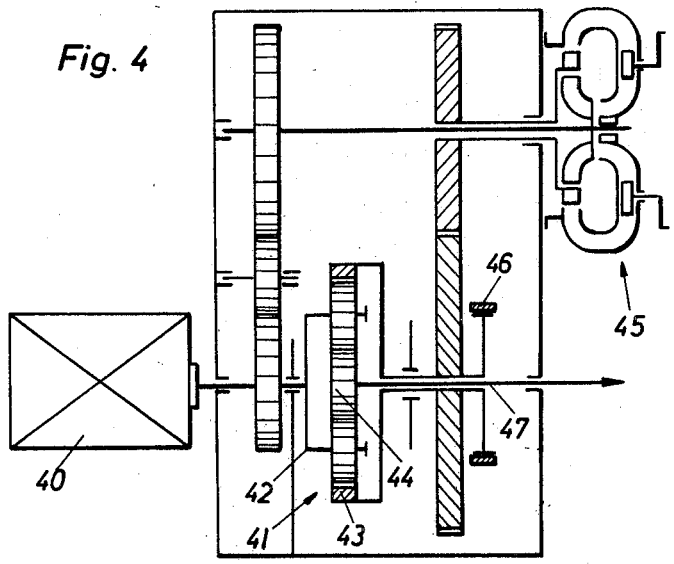
Figure 2:
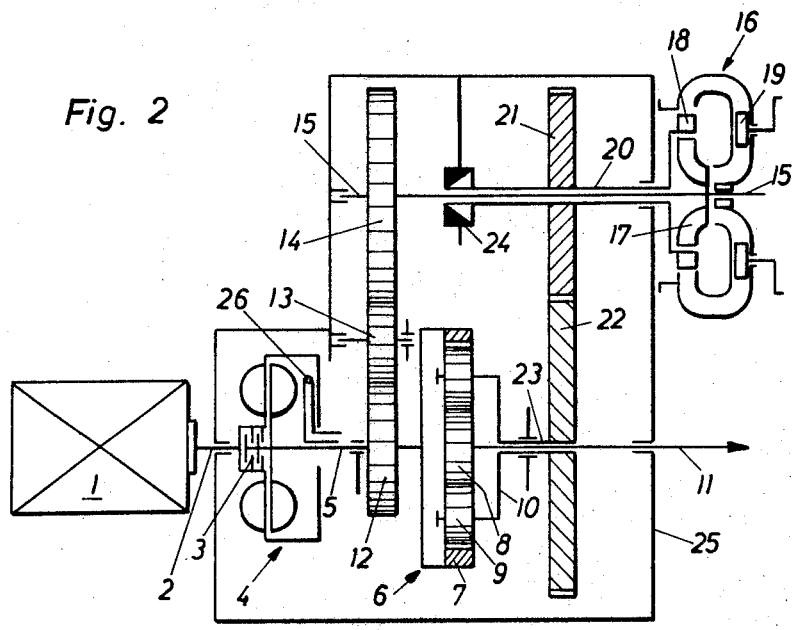
Figure 3:
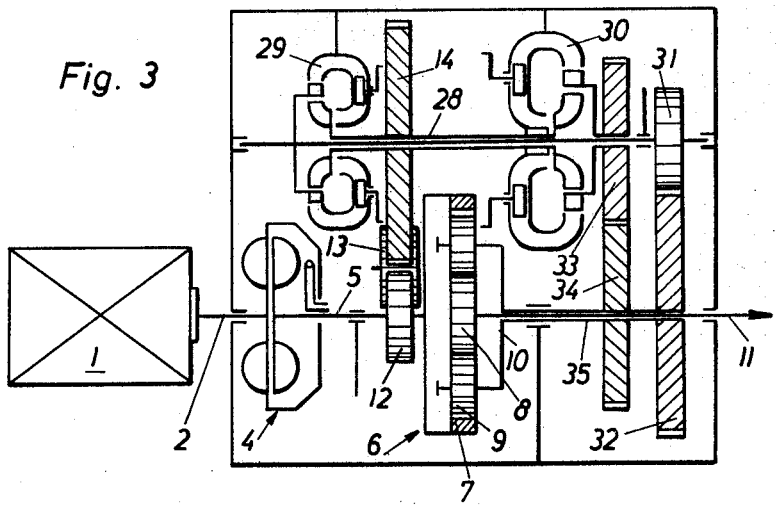

These and other objects and advantages of the invention will appear more clearly from the following specification in connection with the accompanying drawings, in which:

FIGURE 1 illustrates by way of a graph the degree of efficiency of a transmission according to the invention with a control with two torque converters and a fluid coupling;

FIGURE 2 diagrammatically illustrates a superimposed or heterodyne transmission with preceding control coupling and one torque converter;

FIGURE 3 shows a modified transmission according to the present invention which differs from that of FIGURE 2 primarily in that two control converters are provided instead of one; and FIGURE 4 is a still further modification with a differently arranged heterodyne transmission with one control converter but without fluid coupling.

The transmission according to the present invention, which is designed as planetary gear transmission and is intended to obtain an output speed which is variable during operation, especially for driving feed pumps for boilers, and in which the first main member is connected with a driving motor while the second main member is controlled with a heterodyne machine varitable in speed, whereas the third main member is connected to the output shaft, is characterized in that it comprises at least on torque converter as heterodyne machine which is variable as to its output speed, preferably by adjustment of the guide wheel blades.

The drive of the control converter is in customary manner effected by the main drive motor. The selection of such torque converter was heretofore considered not favorable. In the first place, the degree of efficiency, which is lower than the above-mentioned heterodyne machines, was considered disadvantageous. Furthermore, prior to recognizing the advantages of the control converter as heterodyne machine, tests were conducted in order to ascertain whether a variable fluid coupling which at full load with a minimum slip of only approximately 3% is considered as working favorably, would be more suitable as heterodyne machine than a control converter.

The selection of a control converter, therefore, was by no means obvious from the start. However, decisive for the selection of a control converter as heterodyne machine was the finding that the properties of the control converter as heterodyne machine yield an overall optimum, due to the fact that the torque converter is relatively low in cost and that in itself it represents a proved element for high outputs, and that it furthermore has all the advantages of a hydrodynamic fluid circuit as, for instance, high wear resistance, requires a minimum of servicing, has a long life span, and is safe in operation. In a power plant, for instance, the safety of operation is of greater importance than, for example, a slightly less favorable economy, because any failure of the power plant results in considerable expense and loss. Furthermore, a torque converter has the advantage over a fluid coupling that the speed control is not a slip loss control, which is of particular importance when operating under partial load (for instance when driving feed pumps for boilers in a power plant which must be able to cover peak loads). Also, when an overspeed is required, the control converter is superior to a fluid coupling because the latter, at the speed of operation of the output shaft, would always have to be operated with a higher slip than at the overspeed, which represents a higher loss in power.

If the desired speed control range of the output shaft is so great that it cannot betaken care of sufficiently economically by a single control converter, a plurality of torque converters adapted alternately to be filled and emptied are provided as heterodyne machines, said converters being intended for different output speed ranges and being adapted to be controlled as to output speed, preferably by adjustment of the guide blades. The torque converters are either themselves designed for different output speeds or outputs, or are designed for the same output speeds while being followed by different gear transmissions.

With a power transmitting installation which has a full-load range at normal output speed and an over-load range at an over-speed, for instance, for boiler feed pumps, the economy is considerably increased when the torque converter or converters are designed for the uppermost output speed range in such a way that the optimum degree of efficiency is obtained in the full-load range at normal output speed.

A great speed range can in addition to two control converters as heterodyne machine also be realized by means of a fluid coupling which precedes the heterodyne transmission and is adapted to be controlled as to the turbine speed. In this connection, above the fundamental speed of the planetary gear transmission, the control is effected at the output shaft (heterodyne branch at a standstill) by means of the torque converter or converters, whereas below the basic speed of the planetary gear transmission, the control is effected with the fluid coupling.

When providing one or more torque converters as heterodyne machine, it is necessary, when no special provisions are made, that the torque converter or one of the torque converters is always filled over the entire speed range and transmits the torque required by the heterodyne planetary gear transmission for support. This means that the torque converter or converters will also in the lower speed range which is controlled by the fluid coupling, continuously absorb power which, with the torque converter output speed nearly zero or equalling zero, will be transformed only in lost heat, which means that it cannot be utilized for power transmission. This situation is remedied by the possibility of being able to brake-fast the heterodyne part of the planetary gear transmission. Therefore, it is suggested to design the turbine wheel of the torque converter or converters for the lower output speed range so that it can be braked. For this purpose a free-wheel is particularly suitable which is provided between the turbine wheel and a stationary part of the plant (transmission housing). Said free-wheel will when adjusting the speed in a downward direction automatically catch and hold the turbine wheel and the heterodyne part of the planetary gear transmission stationary when the latter intends to turn backwards. The torque converter is hereby completely relieved; it can be emptied. At least, however, the guide blades can be closed completely. In this instance, no or only a very small driving force will be absorbed by the converter.

The advantage obtained by the last-mentioned step is illustrated in FIG. 1 in which the total transmission degree of efficiency $\eta$ is plotted over the speed $n$ of the output shaft. The curve A–B–C illustrates the course of the degree of efficiency when controlling with two torque converters and one fluid coupling. Between the speeds $n_o$ and $n_w$ of the output shaft, the control is effected by means of one converter whereas above the speed $n_w$ the control is effected with the other converter. The basic speed is represented by the character $n_o$ at which the heterodyne part of the planetary gear transmission is held stationary. Below the basic speed $n_o$ the control is effected with the fluid coupling. If the torque converter, as described above, is adapted to be turned off for the lower speed control range, instead of the curve A, the superimposed curve A', i.e., a higher degree of efficiency is obtained which, depending on the design conditions is higher by 5–6% and which improves the degree of efficiency over the entire coupling range (see shaded surface). The economy of the transmission will thus be considerably increased.

If it is desired that an improvement in the degree of efficiency for conditions of operation is effected not in the coupling range, but the heterodyne control range is employed more frequently, the basic speed may be selected higher, for instance, at the value $n'_o$, which means that the heterodyne control range will be shortened. The speed range controlled by the fluid coupling comprises the curves A and D and thus is somewhat enlarged. A favorable result of this provision is seen in a reduction of the power flow in the heterodyne branch which makes possible the selection of a smaller torque converter. As a result thereof, the degree of efficiency of the transmission in the heterodyne control range is improved (see curve E). On an average, the degree of efficiency above the speed $n_o$ (curve D–E) is higher than before. Under these circumstances, in most instances even a single torque converter instead of otherwise required two torque converters will suffice, which has a favorable effect on the construction and cost thereof. The answer to the question—whether in addition to the control coupling, one or two control converters are to be provided, depends on the respective designed control range and the frequency of employment of the speed ranges.

The economy of the installation is furthermore influenced by a bridgeable fluid coupling.

Finally, it is particularly advantageous, when employing a single controllable converter, to flange the same from the outside to the transmission housing. In addition to the advantage of a good access, this arrangement permits an easy exchangeability and thereby a selection of the torque converter in conformity with different outputs and control ranges, but otherwise the parts of the remaining power transmitting elements remain the same.

Three embodiments of the invention are illustrated in the drawing. Referring now to FIG. 2 showing one heterodyne transmission with preceding control coupling and one control converter, the transmission shown therein comprises a driving motor 1 having a shaft 2 which is connected to a hollow gear 7 of a planetary gear transmission 6 through the intervention of a variable fluid coupling 4 adapted to be bridged by a friction clutch 3 and through the intervention of a shaft 5. The sun wheel 8 of the planetary gear transmission 6 is connected to the output shaft 11. Shaft 5 is through the intervention of gears 12, 13, 14 and a shaft 15 drivingly connected to the pump wheel 17 of a torque converter 16 which is flanged from the outside to the transmission housing 25. The turbine wheel 18 of said converter 16 is through a hollow shaft 20 which is coaxial with shaft 15 and through spur gears 21, 22 and a hollow shaft 23 coaxial with the output shaft 11 connected to the planetary gear carrier 10 of the planetary gear transmission 6. The planetary gear carrier 10 and the planetary gear wheels 9 meshing with the hollow gear 7 and the sun wheel 8 form the heterodyne part of the planetary gear transmission. The speed control of the heterodyne part is effected by adjusting the guide blades 19 of the torque converter 16 which are pivotally arranged. By means of a free wheel 24, it is possible to stop the turbine wheel shaft 20 and thereby the planetary gear carrier 10 whereby the basic speed of the output shaft 11 will be realized. The torque converter 16 will in this instance be made ineffective by pivoting guiding blades 19 to their closing position or by emptying the torque converter 16. Below the basic speed, the output speed is controlled merely by means of the fluid coupling 4 and, more specifically, by adjusting the scoop-pipe 26. With a speed control above the basic speed, advantageously, the bridging clutch 3 is engaged to avoid the minimum slip losses of the fluid coupling.

The arrangement according to FIG. 3, which illustrates a heterodyne transmission with preceding control coupling and two control converters, is with regard to motor 1, shafts 2 and 5, fluid coupling 4, planetary gear transmission 6–10, output shaft 11 and gears 12–14 designed in the same manner as the arrangement according to FIG. 2. Through the intervention of gears 12–14 and a hollow shaft 28, in contrast to the arrangement of FIG. 2, two torque converters 29 and 30 are driven which are designed for different speeds and are equipped with adjustable guide blades. The turbine wheels of said converters 29 and 30 are operatively connected through gear pairs 31, 32 and 33, 34 and through the intervention of a common hollow shaft 35, with the heterodyne part of the planetary gear transmission, viz. the planetary gear carrier 10. The two torque converters 29 and 30 which are alternately filled yield two speed ranges of the heterodyne part and thus a relatively wide control range of the output shaft 11.

The heterodyne transmission according to FIG. 4 is of a simpler design than those of FIGS. 2 and 3 inasmuch as it does not require a fluid coupling. Consequently, the speed of the output shaft can be controlled merely above the basic speed. A further difference between the transmission of FIG. 4 and the transmissions of FIGS. 2 and 3 exists with regard to the installation of the planetary gear transmission. The driving motor 40 is, according to the arrangement of FIG. 4 connected to the planetary gear carrier 42 of the planetary gear transmission 41. The hollow gear 43 forms the heterodyne part which is driven by the torque converter 45 and is adapted to be braked-fast by means of a brake band 46. The sun wheel 44 is again mounted on the output shaft 47. The drive of the converter 45 is effected by the driving motor 40 similar to the arrangements of FIGS. 2 and 3.

It is, of course, to be understood, that the present invention is, by no means, limited to the particular embodiments shown in the drawings, but also comprises any modifications within the scope of invention.

What we claim is:

1. A compound transmission for obtaining a variable output speed, especially driving feed pumps for boilers, which includes a planetary gear transmission having three main members, viz. a ring gear, and a planetary gear carrier with planetary wheels meshing with said ring gear, and also a sun gear meshing with said planetary wheels; driving means adapted to be drivingly connected to one of said main members; torque converter means including a pump wheel means and a turbine wheel, said torque converter being adjustable as to speed and operatively connectable with said pump wheel means to one member and said turbine wheel being connected to another one of said three main members; a variable fluid coupling interposed between said driving means and said planetary gear transmission, and an output shaft operatively connectable to the remaining one of said three main members.

3. A compound transmission for obtaining a variable output speed, especially for driving feed pumps for boilers, which includes: a planetary gear transmission having three main members, viz. a ring gear, and a planetary gear carrier with planetary wheels meshing with said ring gear, and also a sun gear meshing with said planetary wheels; driving means adapted to be drivingly connected to one of said main members; torque converter means including a pump wheel means and a turbine wheel, said torque converter being adjustable as to speed and operatively connectable with said pump wheel means to one member and said turbine wheel being connected to another one of said three main members; means for operatively connecting the pump wheel means of said torque converter means to said driving means, speed variable fluid coupling means interposed between said driving means and said planetary gear transmission for effecting driving connection between the driving means and the pump wheel means of said torque converter means, and an output shaft operatively connectable to the remaining one of said three main members.

3. A compound transmission according to claim 2, in which the driving connection between said driving means and said pump wheel means of said torque converter means includes a gear train interposed between said fluid coupling means and said pump wheel means.

4. A compound transmission according to claim 3, in which said gear train is a step-down gear transmission.

5. A compound transmission for obtaining a variable output speed, especially for driving feed pumps for boilers, which includes: a planetary gear transmission having three main members, viz. a ring gear, and a planetary gear carrier with planetary wheels meshing with said ring gear, and also a sun gear meshing with said planetary wheels; driving means adapted to be drivingly connected to one of said main members; torque converter means including a pump wheel means and a turbine wheel, said torque converter being adjustable as to speed and operatively connectable with said pump wheel means to one member and said turbine wheel being connected to another one of said three main members; a variable fluid coupling with pump and turbine wheel means, mechanical clutch means operable selectively to interconnect said pump and turbine wheel means of said fluid coupling means, and an output shaft operatively connectable to the remaining one of said three main members.

References Cited

UNITED STATES PATENTS

| | | | |
|---|---|---|---|
| 2,869,398 | 1/1959 | De Ford | 74—688 |
| 2,890,602 | 6/1959 | Smirl et al. | 74—688 |
| 3,263,527 | 8/1966 | Stockton | 74—688 |
| 2,378,035 | 6/1945 | Pollard | 74—688 |
| 2,412,006 | 12/1946 | Pedersen | 192—3.29 |
| 2,687,657 | 8/1954 | Kagel et al. | 74—688 |
| 2,996,932 | 8/1961 | Gsching | 74—688 |
| 3,108,667 | 10/1963 | Kelley | 74—688 X |
| 3,151,717 | 10/1964 | Kaptur et al. | 192—3.29 |
| 3,176,544 | 6/1965 | Baumeister | 74—732 |
| 3,180,180 | 6/1965 | Helfer et al. | 74—688 X |

ARTHUR T. McKEON, Primary Examiner

U.S. Cl. X.R.

74—677, 192—3.29